INVENTORS:
HELMUT DAUM
OSKAR SCHMIDT
BY: Michael S. Hicker
Attorney

INVENTORS:
HELMUT DAUM
OSKAR SCHMIDT
By: Michael S. Striker
Attorney

Oct. 12, 1971    H. DAUM ET AL    3,611,501
APPARATUS FOR MANUFACTURING FOOTWEAR
Original Filed May 1, 1967    6 Sheets-Sheet 6

INVENTORS:
HELMUT DAUM
OSKAR SCHMIDT
By: Michael S. Striker
Attorney

United States Patent Office 3,611,501
Patented Oct. 12, 1971

3,611,501
APPARATUS FOR MANUFACTURING FOOTWEAR
Helmut Daum, Eberbach, Germany, and Oskar Schmidt, Wyrgasse 6, Vienna, Austria; said Daum assignor to said Schmidt
Original application May 1, 1967, Ser. No. 636,242, now Patent No. 3,535,418, dated Dec. 17, 1969. Divided and this application June 18, 1970, Ser. No. 47,511
Claims priority, application Austria, May 3, 1966, A 4,181/66
Int. Cl. B29h 5/12, 9/00
U.S. Cl. 18—19 S        8 Claims

ABSTRACT OF THE DISCLOSURE

Device for making footwear wherein the mold is equipped with a mold cavity having a shape corresponding to the shape desired for a finished shoe upper. This cavity has an open side and is adapted to accommodate a main body portion of an upper blank of deformable material. The device includes also support means for supporting the blank with a marginal portion extending outwardly through the open side. Finally, the device also includes the forming means arranged within the cavity and adapted to deform the main body portion of the blank into conformity with the shape of the cavity.

CROSS-REFERENCE TO RELATED APPLICATION

This application is a division of our co-pending application, Ser. No. 636,242, filed May 1, 1967 now U.S. Pat. No. 3,535,418.

This invention relates to a method of manufacturing footwear particularly shoes which avoids the use of lasts such as are used in conventional manufacturing techniques.

Apparatus for manufacturing footwear according to this invention may comprise a hollow mold and a former movable relative to the mold and comprising a plate fitting the mouth of the mold and an expansible bag. The apparatus may also comprise a sole mold and means for securing it over the mouth of the hollow mold.

The novel apparatus is described in the following description of the accompanying drawings in which the manufacture of three different kinds of shoes is described by way of example.

DESCRIPTION OF THE PREFERRED EMBODIMENTS

Example 1

Figure 1:
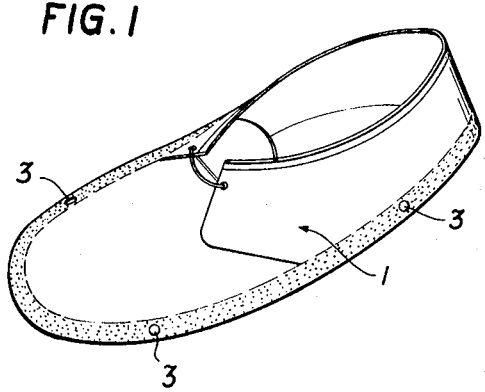
FIG. 1 shows a view of a closed upper as used in Example 1.

A closed upper 1 (FIG. 1), which for example may be made of smooth artificial leather and may have toe and heel stiffeners, is formed with a feather edge or sole attachment margin 2 which for example is 6 mm. wide and which is roughened.

Figure 2:
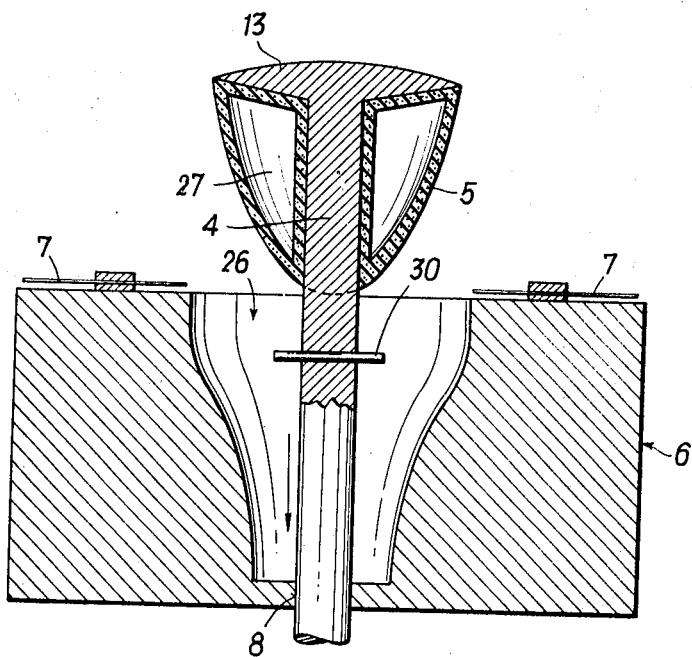
FIG. 2 is a diagrammatic transverse cross-section in the heel zone of the former and hollow mold, the former being shown in the open position.

This upper, after softening if necessary by the action of heat or moisture, is arranged on a former 4 (FIG. 2) which is mounted on a stem 8 so that it can be drawn down into the cavity 26 of a hollow mold 6. The former comprises a plate 13 which closely fits the mouth of the cavity 26 and an elastic bag 5 which may be expanded to fill the cavity 26 by the introduction of pressure fluid (medium) conveniently supplied through the stem 8.

The hollow mold 6 is shaped to the required form of the upper and its top surface and also that of the plate 13, is contoured so that the adjacent edges of the plate and the mouth of the mold follow the insole line of the shoe to be made.

Figure 3:
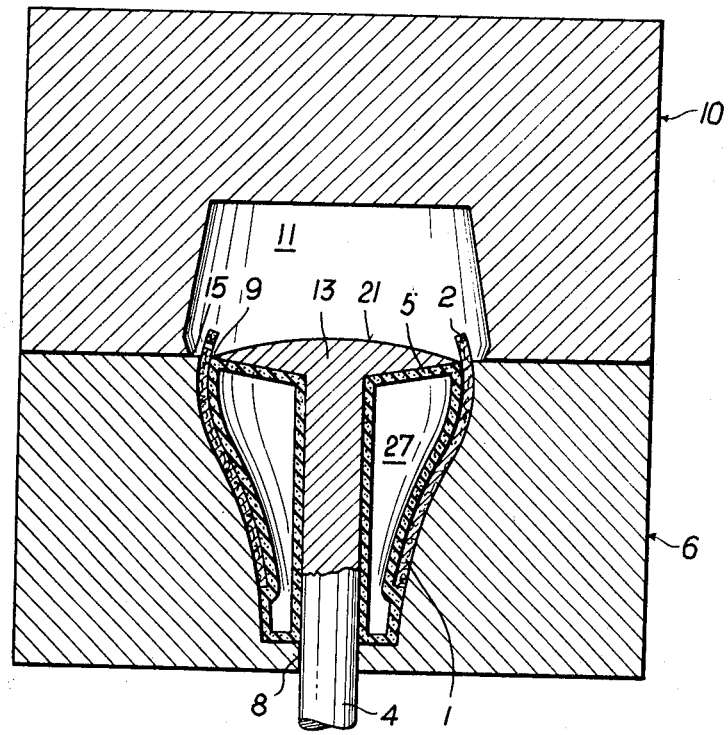
FIG. 3 is a diagrammatic transverse cross-section similar to FIG. 2 but with the former shown in the closed position, the upper already formed to shape and a sole mold applied in the preparation for the formation of soles.

After the upper has been positioned on the former 4 this former is moved downwards into the mold and until the sharp edge of the plate 13 grips the margins of the upper only at the junction of the marginal portion 2 and the main portion against the edge of the mold cavity, for example in the region 9 (FIG. 3). It will be appreciated that the upper is pulled over the former 4 until a predetermined line is precisely located with respect to the edge of plate 13, for example the line defined by the joint of margin 2 with the upper 1 should coincide with the edge of plate 13. To ensure that no change in position occurs during the subsequent operation, the margin 2 may also be located by means of movable needles 7 (FIG. 2) engaging in holes 3 formed in the margin.

With the former 4 now closed on mold 6, pressure fluid, for example hot oil, is supplied to the bag 5 which expands to fill the cavity 26 in the mold and in so doing stretches the upper and forces it against the wall of cavity 26 whereby it is formed to the desired shape.

Figure 4:
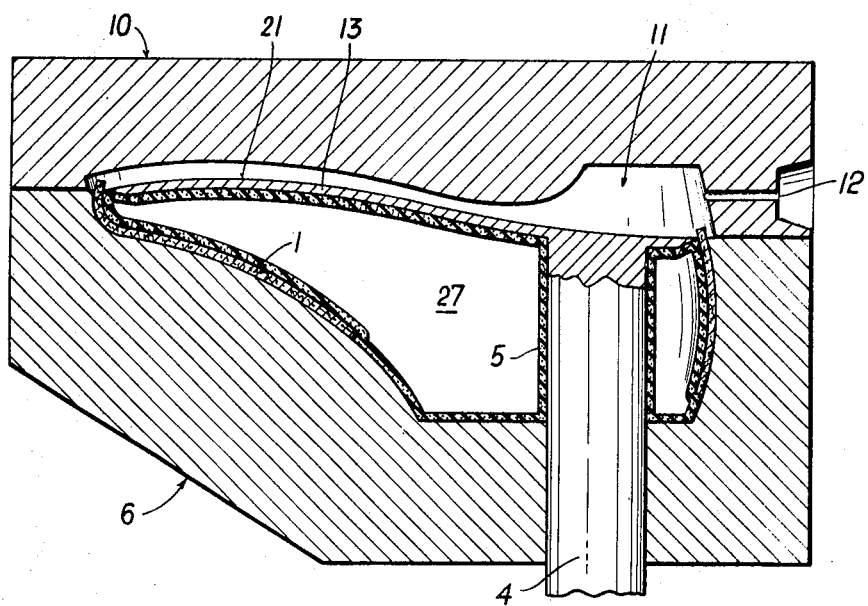
FIG. 4 is a diagrammatic longitudinal section of the arrangement of FIG. 3.

After this forming operation the needles 7 are removed and a sole mold 10 (FIGS. 3 and 4) is applied onto the hollow mold 6, the two molds being shaped so that they seal one on the other.

The arrangement is now as shown in FIG. 3 and it will be seen that the margin 2 of the upper 1 protrudes into the cavity 11 of the sole mold 10.

A suitable sole forming material, such as P.V.C., is now injected into the cavity 11 through orifice 12, and after the material has set the sole mold 10 is withdrawn. The pressure fluid in the bag 5 is now withdrawn, the former 4 is raised to the position shown in FIG. 2, and the completed shoe removed therefrom.

It will be appreciated that the movement of the former 4 and the sole mold 10 may be achieved by any suitable mechanical, pneumatic or hydraulic means.

Example 2

Figure 6:
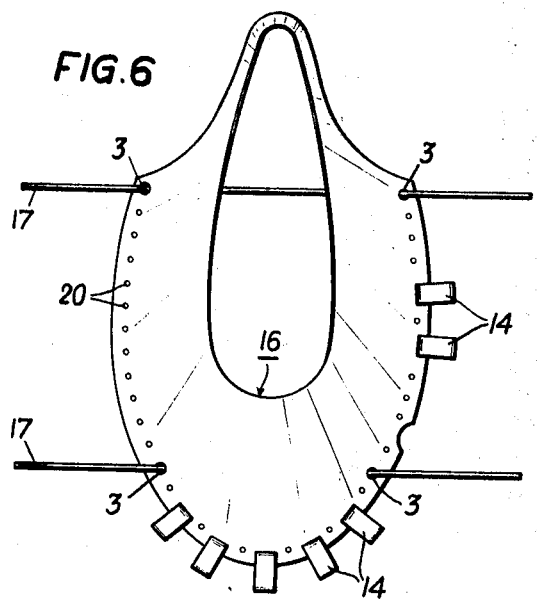
FIG. 6 shows a plan view of an upper for the sling back shoe of Example 2.

An upper 16 (FIG. 6) for a sling back type shoe having an inserted toe cap of smooth leather and a sole attachment margin 2 of a uniform width of, say 5 mm., which margin is roughened or provided with a chemical adhesive, is brought to a relative humidity of 80% by the action of steam. Within and around the sole attachment margin 2 are arranged sole-fastening holes 20 having a diameter of about 2 mm. and four fixing holes 3, located at the toe cap end and the rear end of the upper. Long fixing needles 17, resembling knitting needles, and 2 mm. in diameter, are inserted through the fixing holes 3, so as to extend from one side of the body to the other, the arrangement being such that when the upper 16 is drawn onto the former 4 the plate 13 is positioned between the needles 17 and the upper 16.

Figure 7:
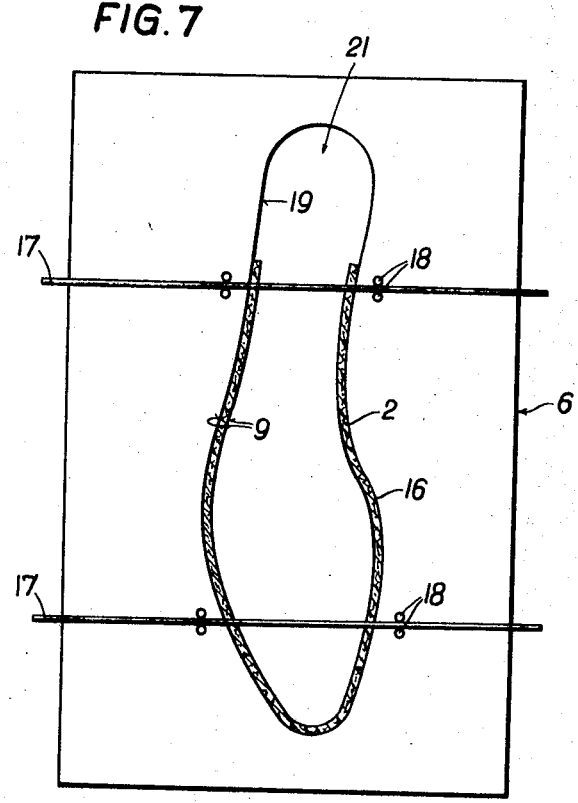
FIG. 7 is a plan view of the arrangement of FIG. 5.

The former 4, together with the upper thereon, is moved downwards into the cavity 26 of the hollow mold 6 as previously described, and the fixing needles 17 are now inserted between the stop pins 18 (FIG. 7).

The closure plate 13 grips the margin 2 of the upper against the edge of the mold cavity, e.g. in the region 9, but at the heel end any space between the plate and the mold cavity is sealed by the elastic bag 5.

Figure 5:
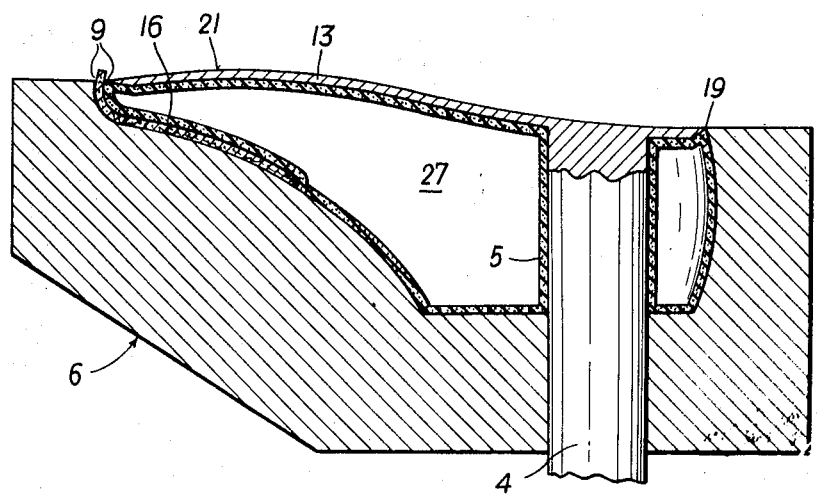
FIG. 5 is a section similar to FIG. 4 but omitting the sole mold illustrating how the same apparatus may be used to produce a sling back type of shoe (Example 2)

To prevent protrusion of the bag in the region 19 (FIGS. 5 and 7) the adjacent edge of the bag may be suitably reinforced.

The bag is now expanded, as by the introduction of hot steam under pressure, and the upper thereby formed to the shape of the mold 6. As an additional precaution to prevent the margin 2 of the upper being pulled into the mold during the forming operation, clips 14 (FIG. 6) may be attached to the margin.

After forming, the top clips 14 and fixing needles 17 are removed by hand or mechanically, and the sole mold 10 is pressed onto the mold 6. By means of injection apparatus the sole material, for example a polyurethane elastomer, is injected in the form of an appropriate mixture of its basic materials through the injection orifice 12 (FIG. 4) into the cavity 11 of mold 10. The mass forming the sole thereby fills the cavity 11 and flows around the sole attachment margin 2 and through the sole-fastening holes 20, whereby a particularly good attachment of the sole to the upper 16 is achieved. The mold 6 may be formed from a porous material through which steam can pass, and it may have a temperature of about 70° C. (Because of the thermal effects of the mold 6 and the bag 5, filled with a hot pressure medium, upon the shaped upper 16 the humidity of the material is reduced within a few minutes to a normal humidity content.) The thermal effect on both sides of the upper 16 is equivalent to an ironing action which imparts a very good shape stability to the finished shoe. The steam generated during the drying process escapes outwards through the steam-permeable mold 6. After about ten minutes the mold is opened, i.e. the sole mold 10 is raised and releases the sole. The pressure in the bag 5 is reduced and its volume thereby considerably diminished; if necessary, it can be still further reduced by application of a vacuum. The former 4 is now raised and thereby removes the finished shoe from the mold 6. The shoe can now be removed from the former 4.

Example 3

Figure 8:
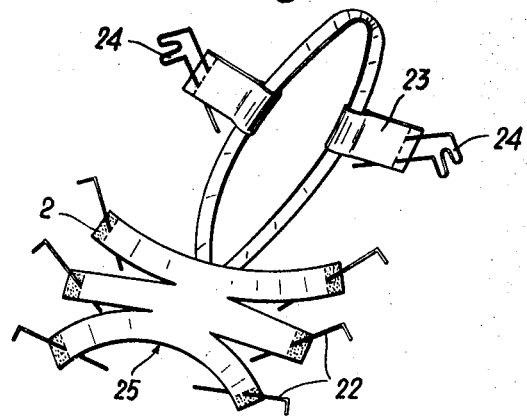
FIG. 8 shows a view of a strapped sandal upper (Example 3)
Figure 9:
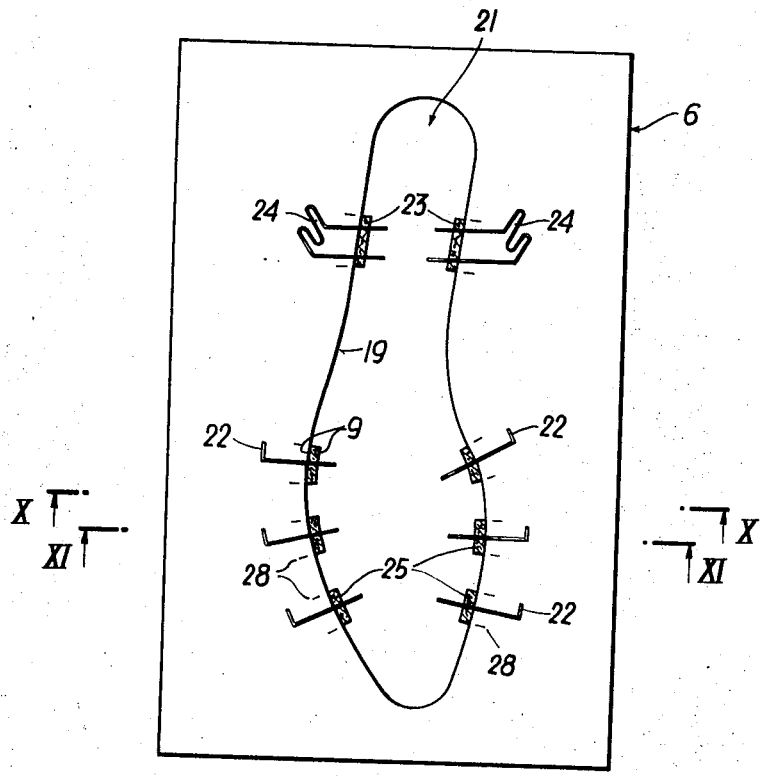
FIG. 9 is a plan view, corresponding to FIG. 7, illustrating the manufacture of the sandal (Example 3)
Figure 10:
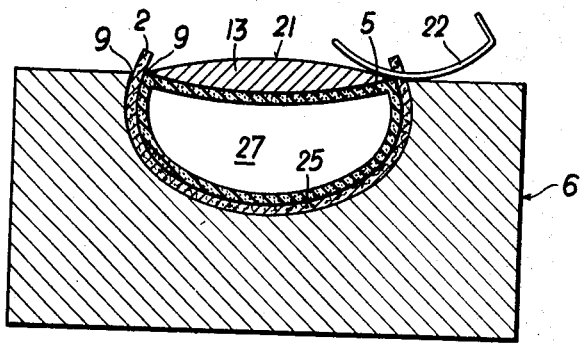
FIGS. 10 and 11 are respectively cross-sections on the lines X—X and XI—XI of FIG. 9, FIG 11 however showing a sole mold in position.
Figure 11:
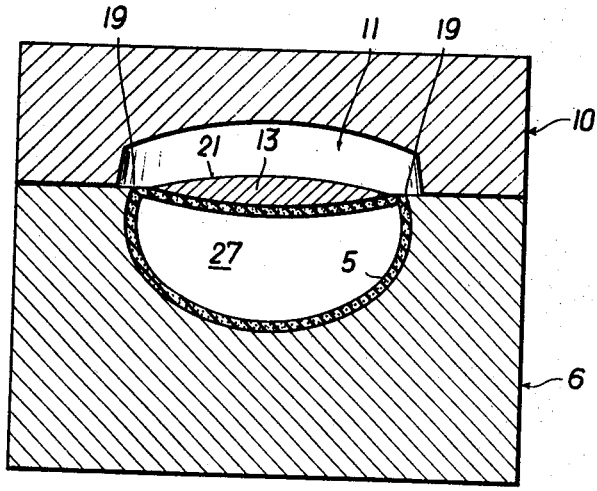

A 6 mm. wide sole attachment margin 2 of a leather strap sandal upper 25 (FIG. 8) is roughened and provided with fixing holes 7. Hook-shaped fixing needles 22, of semicircular cross-section, are inserted in the fixing holes, and a hook-shaped fixing clip 24 which is formed for two fixing holes, is inserted into each of the heel webs 23 which are fairly wide. The upper 25 is forced over the former 4 and its deflated bag 5 which is then drawn down into the cavity 26 of mold 6 which is formed to correspond to the desired shape of a finished closed shoe. Before plate 13 seals the mold cavity the fixing needles 22 and the fixing clips 24 are laid over the closure plate 13 in such a way that the ends of the straps coincide with markings 28 on the mold 6. The former 4 is now moved downwards into the cavity 26 to a position determined by a stop 30 located on the stem 8. The bag is now inflated by means of steam at about 10 atmospheres and thereby achieves the shaping of the strap sandal upper 25 and the sealing of the cavity 11 in mold 10 intended for forming the sole in the next operation. In this example two kinds of sealing are used. Sealing at region 9 is achieved by clamping between the mold 6 and the plate 13 the thickness of the upper in the zone of the sole attachment margin 2. On the other hand, sealing at region 19 is effected by the bag 5 applied below and against the plate 13 and the side of mold 6 in such manner as to seal the gap therebetween when the volume of the bag increases. In the region of the sole and particularly at the sealing region 19, the bag 5 can have horizontally disposed reinforcements, e.g. in the form of rods of metal or solid plastic, which enable the bag 5 to expand at the sealing region 19 only in a roughly horizontal direction whereby expansion of the bag 5 into the cavity 11 during the increase in volume is prevented.

After the upper 25 has been shaped, the hook-shaped fixing needles 22 and fixing clips 24 are withdrawn from the sole-attachment margin 2 and this can be readily done by hand or mechanically because of the hook-shaped arrangement. A sole mold 10 (FIG. 1) is now applied to the hollow mould 6, the bag 5 being maintained in its expanded condition. By means of a rubber-injection machine, a rubber mixture with a rising additive is injected into cavity 11. The rubber mixture begins to rise, fills the cavity to form the sole, which bonds itself onto the sole-attachment margin 2 and flows through the fixing holes 7 located at each strap end, whereby an additional anchoring of the straps to the sole is achieved. The temperature of the mold 10 is about 150° C., that of the closure plate 13, the bag 5 and the mold 6 each being about 70° C. After about five minutes the mold 10 is raised and frees the sole. The bag is reduced in size by about 50% by an appropriate reduction in presssure and finally the former 4 is raised thereby to remove the finished sandal from the mold 6. The finished strap sandal can now be removed from the former 4.

Figure 12:
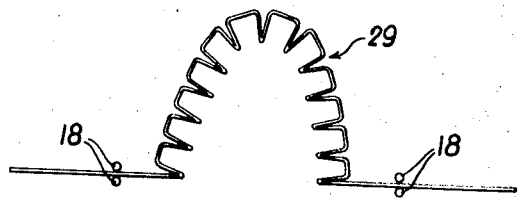
FIG. 12 shows a particularly advantageous form of a clip which is intended for locating the marginal edge of an upper in the region of the toe cap.

As can be seen from the three examples of the method according to this invention, by the use of an appropriately shaped bag and with one and the same set of molds, closed shoes as well as shoes which have more or less large recesses in the region where the sole is attached to the upper, e.g. strap sandals and sling back shoes and the like, can be produced, the attachment of a sole being preferably carried out by an injection process or a similar method of making the sole. Stop-clips, stop-clamps, needles, pegs, clasps, stitched-on straps or profiles etc. can be used in a great number of variants and forms in order to locate the upper in the correct position and to act as stops during the process of shaping the upper so that the sole attachment margin projects a prescribed distance beyond the edge of the mold 6. A particularly advantageous embodiment of a combined stop and fixing means is illustrated in FIG. 12. This clip 29 is fitted to a loose upper by insertion in, for example, thirteen sole-fastening holes in the toe portion of an upper. The long ends of the clip 29 serve for fixing the upper and are inserted between the stop pins 18 upon closure of the former into the mold 6. As can be seen from FIG. 12, the clip 29 corresponds in shape to the contour of the toe of the sole. Upon fitting of the clip to the loose upper by insertion into the sole-fastening holes, the upper is drawn over the former 4 and lowered into and held in the mold 6.

The uppers can of course be shaped in the region of the toe, the heel and the instep before they are fitted over the former 4. In the method according to the invention, the uppers can be made of any desired material, such as all kinds of upper leather, P.V.C. the large variety of artificial leathers, rubber or knitted or woven or unwoven materials coated with plastic, etc.

For manufacturing the sole of the shoe, a wide variety of sole-forming materials can be injected, vulcanized, or applied by chemical reaction, e.g. polyurethane elastomers, also in the form of mixtures of their basic components, e.g. mixtures of di- or polyisocyanates with di- or polyhydroxyl compounds and appropriate additives or crosslinking agents, mixtures of natural and synthetic rubber, plastic pastes, especially P.V.C., granulates, plastisols, polyalkylene plastics or mixtures (e.g. polybutadiene) etc. For the purpose of reducing cost and improving quality, it is of course possible to use as additives a wide variety of fibrous materials, such as glass wool and slag wool, and various flock materials such as cotton, cellulose, nylon etc. flock; furthermore, additions of ZnO and/or MgO can be used. Coloring is possible with the help of suitable organic and inorganic coloring materials such as, for example, organic pigments, $TiO_2$, iron oxide coloring agents, lithopone, etc. For softening, aromatic and aliphatic softening agents, unsaturated and saturated fatty acids, zinc or barium stearate, lanolin, coconut oil, etc. can be considered.

Instead of forming the soles directly onto the sole attachment margin and bonding them thereto at the same time, it lies within the ambit of the invention that the uppers, formed with the help of the former 4 and mold 6, may be attached onto preformed soles, e.g. by bonding. If necessary, the sole attachment margin 2, projecting from the former 4 and mold 6, can be bent inwards or outwards by appropriate means, e.g. rollers.

It is possible to fit to the closure plate 13 of the former 4 a wide variety of inserts such as, for example, felt, wood, sponge plastic and cork inserts including inserts shaped to the foot, as well as reinforcements of metal, fibreglass and wood; plastic material for giving spring to the instep, complete sole reinforcements, heel-stabilization elements, preferably in the form of small tubes of light material for accommodating covering strips and to enable the covering strips to be changed for the purpose of repairs etc. which fitments can be applied, for example, by means of needles, nails, clamps, pins, etc. projecting from the closure plate 13. All these inserts and reinforcement means can of course also be inserted loose.

Furthermore, it is possible to place in the sole mold 10 pre-manufactured elements which, if desired, will be visible in the finished shoe, e.g. outer soles of different color, intermediate soles, half-soles, heels and heel-cover strips of different colors, and consisting of leather, rubber, plastic, etc. and to bond these to the additional sole attachment material by injection, vulcanization, or chemical reaction.

The molds 6 may be designed as porous bodies through which steam can pass. Pressings made of granulated aluminum and synthetic resin binding agents, e.g. epoxy resins, have proved particularly reliable for this purpose. Molds made, for example, by sintering powdered metal pressings, however, might also be considered. Suitable temperatures in the molds for shaping the shoe upper and the pressure for filling the bag will depend upon the materials used and can therefore vary over very wide ranges; temperatures of from room temperature to about 200° C. and pressures from about 3 to about 100 atmospheres are possible.

With the method according to the invention, considerable advantages, a pronounced improvement in shoe quality, and, in particular, a large saving in material, especially in the case of dished-sole shoes (Mudgment shoes), can be achieved. The accurately predetermined sole attachment margin usually need only be from 4 to 6 mm. Nevertheless and especially when reinforced by the sole-fastening holes 20, a very good connection of the sole to the upper is achieved. With dished-sole shoes, the saving in the nipping allowance amounts to up to 25 mm. in width along the sole attachment margin on the upper, depending upon the depth of the dished sole. For fitting the uppers in the molds, no specially qualified operatives are needed, and the shaping process on the upper as well as the operation of soling are carried out at one work point. The insertion of the uppers on the formers is so simple that it can be carried out without difficulty even by automatic manipulators.

A further advantage of the method, according to the invention, resides in the fact that the surface 21 of the closure plate 13 of the former 4 can have depressions and protuberances, so as to form a fully plastic bed in the sole either from the tip to the heel or only in partial zones of the foot, e.g. only at the heel, depending upon the anatomy of the foot. The surface 21 of the closure plate 13 can, of course, also be provided for example with engraved marks for the purpose of simulating leather graining, or for indicating manufacturers' names, trademarks, shoe sizes, etc.

It will be understood that each of the elements described above, or two or more together, may also find a useful application in other types of apparatus differing from the types described above.

While the invention has been illustrated and described as embodied in apparatus for manufacturing footwear, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. Device for making footwear comprising, in combination, mold means provided with a cavity having a shape corresponding to the shape desired for a finished shoe upper, said cavity having an open side defining an edge of said cavity and being adapted to accommodate a main portion of an upper blank of deformable material; support means including means for closing said open side of said cavity and for clamping the blank substantially along a line against said edge for supporting the blank in a predetermined relationship to said mold with a marginal portion extending outwardly through said open side and a main body portion of the blank accommodated within the cavity; and deforming means arranged within said cavity for deforming the main body portion of the blank into conformity with the shape of said cavity.

2. Device as defined in claim 1, wherein said deforming means comprises expansible means carried by said support means.

3. Device as defined in claim 2, wherein said expansible means comprise an expansible envelope, and conduit means communicating with the interior of said envelope for introducing a fluid under pressure thereinto.

4. Device as defined in claim 3; and further comprising additional mold means adapted to sealingly engage said mold means and having an additional cavity facing and surrounding said open side so that the marginal portion of the blank extends into said additional cavity; and means for introducing a solidifiable sole-forming material into said additional cavity for solidification of such material into a sole and concomitant joining of the material to the margin portion of the blank.

5. Device as defined in claim 4; and further comprising a heating arrangement operatively associated with said device for heating at least one of said means.

6. Device as defined in claim 2, wherein said closing means is carried by said support means, said support means being movable with said closing means and said expansible means between a first position in which said closing means and said expansible means are located outside said cavity and a second position in which said expansible means is located inside said cavity and said closing means closes said open side.

7. Device as defined in claim 6, wherein said mold means is formed opposite said open side with a bore, and wherein said support means comprises a stem slidably arranged in said bore and said closing means comprises a plate fixed to said stem and having an outer annular edge adapted to cooperate with said edge at said open side of said cavity to clamp the blank substantially along a line between said marginal portion and said main body portion of the blank when said support means is in said second position.

8. Device as defined in claim 4, wherein said closing means separates said additional cavity from said first-mentioned cavity.

References Cited

UNITED STATES PATENTS

| | | | |
|---|---|---|---|
| 2,907,074 | 10/1959 | Rhodes | 264—244 X |
| 3,305,895 | 2/1967 | Ludwig | 264—244 X |
| 3,441,643 | 4/1969 | Tusa et al. | 264—244 |

ROBERT L. SPICER, JR., Primary Examiner

U.S. Cl. X.R.

18—6 S, 17 S, 30 HS; 264—244